(12) United States Patent
Cermak

(10) Patent No.: US 7,621,817 B2
(45) Date of Patent: Nov. 24, 2009

(54) CONSTANT VELOCITY JOINT-WHEEL HUB ASSEMBLY WITH A HOLLOW CONNECTION

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 377 days.

(21) Appl. No.: 11/554,121

(22) Filed: Oct. 30, 2006

(65) Prior Publication Data

US 2007/0117639 A1    May 24, 2007

(30) Foreign Application Priority Data

Nov. 11, 2005   (DE) ..................... 10 2005 054 284

(51) Int. Cl.
*F16D 3/223*    (2006.01)

(52) U.S. Cl. ........................... 464/178; 464/906

(58) Field of Classification Search ............... 464/178, 464/906; 384/544, 589; 301/105.1; 411/395
See application file for complete search history.

(56) References Cited

U.S. PATENT DOCUMENTS 4,165,904 A * 8/1979 Reppert .................. 411/395 X
4,460,058 A * 7/1984 Welschof et al. ............ 464/906
4,571,099 A * 2/1986 Balken et al. ............ 384/544 X
6,146,022 A * 11/2000 Sahashi et al. .............. 384/544
6,739,978 B2 * 5/2004 Hacker et al. ............... 464/178

FOREIGN PATENT DOCUMENTS

DE          103 38 172           6/2005
WO       WO2006050785 A1        9/2006

OTHER PUBLICATIONS

English language abstract for DE 103 38 172.

* cited by examiner

*Primary Examiner*—Greg Binda
(74) *Attorney, Agent, or Firm*—Rader, Fishman & Grauer, PLLC

(57) ABSTRACT

A constant velocity joint-wheel hub assembly wherein the wheel hub includes a sleeve portion for receiving a wheel bearing and a flange for threading on a wheel and wherein the constant velocity joint has an annular outer joint part with apertures at both ends. Axial tensioning means pass through the sleeve portion and, through one aperture, engage the outer joint part. The sleeve portion and the outer joint part contact one another in an axially mutually supporting way. The axial tensioning means include a hollow member which is supported on the wheel hub and on the outer joint part. Between the sleeve portion and the outer joint part, there are provided form-fitting engagement means for the purpose of transmitting torque between the wheel hub and the constant velocity joint.

9 Claims, 9 Drawing Sheets

CONSTANT VELOCITY JOINT-WHEEL HUB ASSEMBLY WITH A HOLLOW CONNECTION

TECHNICAL FIELD

The invention relates to a constant velocity joint-wheel hub assembly for connecting the constant velocity joint at the wheel end of a sideshaft of a motor vehicle to the wheel hub received by a wheel carrier arranged at the vehicle. The wheel hub comprises a sleeve portion for accommodating a wheel bearing which, in turn, is held in the wheel carrier, as well as a flange for bolting on a wheel, i.e. the central portion of the wheel disc.

BACKGROUND OF THE INVENTION

In assemblies of the type known from the state of the art, the outer joint part comprises a formed-on journal which carries splines which are inserted into inner splines of a through-aperture of the hub wherein, for axial tensioning purposes, a screw with a washer arranged underneath the screw head is threaded into the end of the journal. For reducing the assembly length which is required for dismantling the driveshaft and which has to be received by the plunging joint of the driveshaft at the gearbox end, short and ultra-short journals have already been proposed. Because of the length of the sleeve portion, which is required for the wheel bearing, the screw length and in some cases the size of the washer increases, resulting in disadvantageous deformations at the screw and at the washer, with the washer being deformed conically. With an increasing size of the wheel bearing, an additional space has to be bridged by the screwed connection, which results in an unnecessary increase in weight. From DE 103 38 172 BE and WO 2006/050785, there are known wheel hub joint units wherein the screw heads are supported directly against a radial face of the wheel hub.

From U.S. Pat. No. 4,571,099, there is known a constant velocity joint-wheel hub assembly wherein a wheel bearing forms a bearing groove on a sleeve projection at the wheel flange and a bearing groove on a sleeve projection at the outer joint part of the constant velocity joint. A hollow member inserted into the sleeve projections for the purpose of tensioning the wheel hub and constant velocity joint is conically widened at its ends and, by outer teeth, engages counter teeth at the wheel hub and at the outer joint part.

SUMMARY OF THE INVENTION

The present invention provides an assembly comprising a constant velocity joint and a wheel hub of the initially mentioned type having improved axial tensioning which permits the weight to be reduced or the strength to be increased. Specifically, the present invention provides a constant velocity joint-wheel hub assembly wherein the wheel hub comprises a sleeve portion for receiving a wheel bearing and a flange for threading on a wheel and wherein the constant velocity joint comprises an annular outer joint part with apertures at both ends, wherein an axial tensioning device passes through the sleeve portion and, through one aperture, engages the outer joint part and wherein the sleeve portion and the outer joint part contact one another in an axially mutually supporting way. The axial tensioning device comprises a hollow member which is supported on the wheel hub and on the outer joint part. Between the sleeve portion and the outer joint part, a form-fitting engagement mechanism is provided for the purpose of transmitting torque between the wheel hub and the constant velocity joint. More particularly, the hollow member can be positioned with a clearance fit in a cylindrical through-aperture in the sleeve portion.

The inventive embodiment achieves a direct introduction of the axial forces required, which leads to a stiffer connection due to a reduced deformation rate. As will be explained below, the inventive hollow members can be provided in the form of hollow screws or hollow pins for applying the required axial tensile forces. In the case of the hollow screws, a torsional load is developed which is much more advantageous than in the case of solid screws wherein the resistance moment of the screw cross-section against torsion is clearly more disadvantageous as compared to the cross-sectional area subjected to tensile loads. If hollow screws are used, the axial tensioning device is almost completely free of disadvantageous torsional forces. A further advantage of the inventive assembly is that the deformation process between the joint and the hollow member is disconnected. Furthermore, because the hollow member comprises a relatively large diameter so that the introduction of force into the joint base takes place on a large radius, the bending moments at the joint base are minimized. In addition, as a result of the small radial distance between the hollow member and the contact face of the outer joint part at the wheel hub, the respective lever arm which influences the magnitude of the bending moments is small.

According to a first embodiment, the hollow member is supported via a formed-on flange ring on at least one of the parts—either on the wheel hub or on the outer joint part. By using an annular flange which is simply formed on, it is possible to reduce the number of parts and to reduce the weight of the axial tensioning device. The annular flange can either be supported inside on an abutment face of the outer joint part or on a supporting face of the wheel hub, and at the opposite end of the hollow member, it is necessary to provide a removable connection.

According to a first design, the hollow member is supported on one of the parts—either the wheel hub or the outer joint part—via an outer thread which can be formed axially opposite a flange ring and which is threaded into an inner thread in the wheel hub or in the outer joint part. More particularly, in this embodiment, in the hollow member, there are provided inner form-fitting engagement mechanisms such as a hexagon socket or a splined socket for the purpose of introducing torque during the threading-in operation. The hollow member is provided in the form of a hollow screw.

According to a second design concerning the principle of the invention, the hollow member is supported on one of the parts—on either the wheel hub or on the outer joint part—via a securing ring which can be arranged axially opposite the flange ring and which engages an outer groove in the hollow member and an inner groove or an inner step in the wheel hub or in the outer joint part. More particularly, in the hollow member there are provided inner form-fitting engagement mechanisms such as an inner thread, for the purpose of introducing axial forces during the operation of inserting the securing ring. In this case, the hollow member is provided in the form of a hollow pin of the tensile pin type. For temporarily introducing tensile forces, a special force application device is provided.

According to a third design concerning the principle of the invention, the hollow member is supported on one of the parts—either on the wheel hub or on the outer joint part—via a tensioning screw which is screwed in axially opposite the flange ring and which is screwed by an outer thread into an inner thread in the hollow member and is axially supported by a radially projecting collar on the wheel hub or in the outer joint part. In this example, in the tensioning screw, there are provided inner form-fitting engagement mechanisms such as a hexagon socket or a splined socket for the purpose of introducing torque during the threading-in operation. In this case, too, the hollow member is provided in the form of a hollow pin for applying tensile forces, with the introduction of axial forces continuously taking place via a thread.

For the purpose of transmitting torque between the outer joint part and the hub, at the sleeve portion of the wheel hub and at the outer joint part, there are provided inter-engaging end teeth as form-fitting engagement mechanisms for the purpose of transmitting torque. More particularly, when a wheel bearing has been slipped on to the sleeve portion, and an inner bearing race is held by a beaded collar of the sleeve portion, at said beaded collar, there are formed end teeth.

According to an alternative embodiment of the mechanism for transmitting torque between the outer joint part and the wheel hub, at the sleeve portion of the wheel hub and at the outer joint part, there are provided inter-engaging splines as a form-fitting engagement for the purpose of transmitting torque. At the sleeve portion, inner splines can be provided and at the outer joint part, outer splines can be provided. For the purpose of stiffening the outer joint part, it is possible for the hollow member to comprise two portions with a stepped diameter, wherein the portion with the smaller diameter carrying an outer thread which engages an inner thread at the outer joint part.

According to a further embodiment, a cover for sealing the constant velocity joint can be inserted into the hollow member near the end of same facing the joint. The inner volume of the constant velocity joint, which has to be filled with grease, is reduced to the required dimensions.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

DETAILED DESCRIPTION OF THE DRAWINGS

Figure 1:
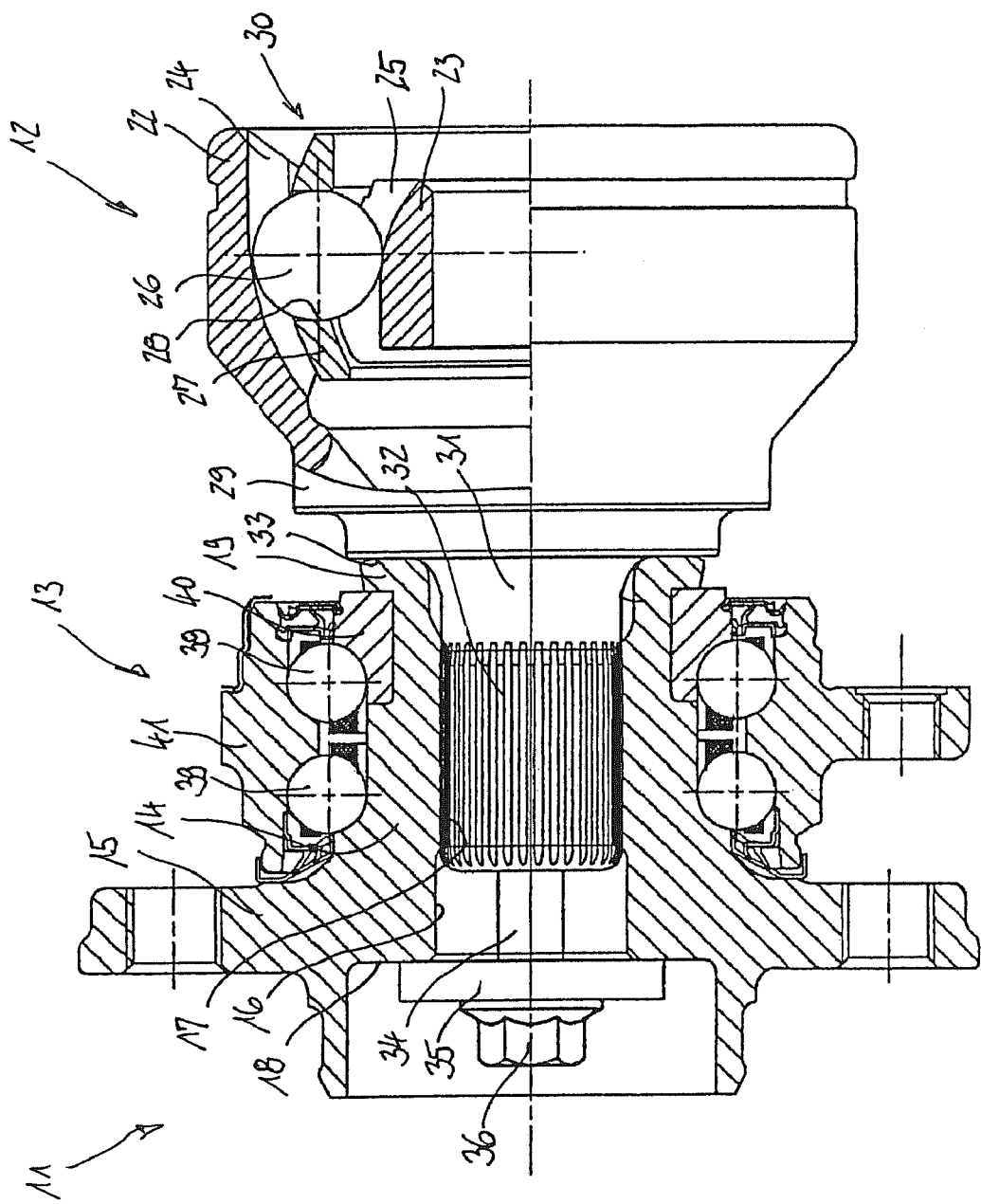
FIG. 1 shows a longitudinal section of a constant velocity joint-wheel hub assembly according to the state of the art with a short journal at the outer joint part for tensioning and torque transmitting purposes.
Figure 2:
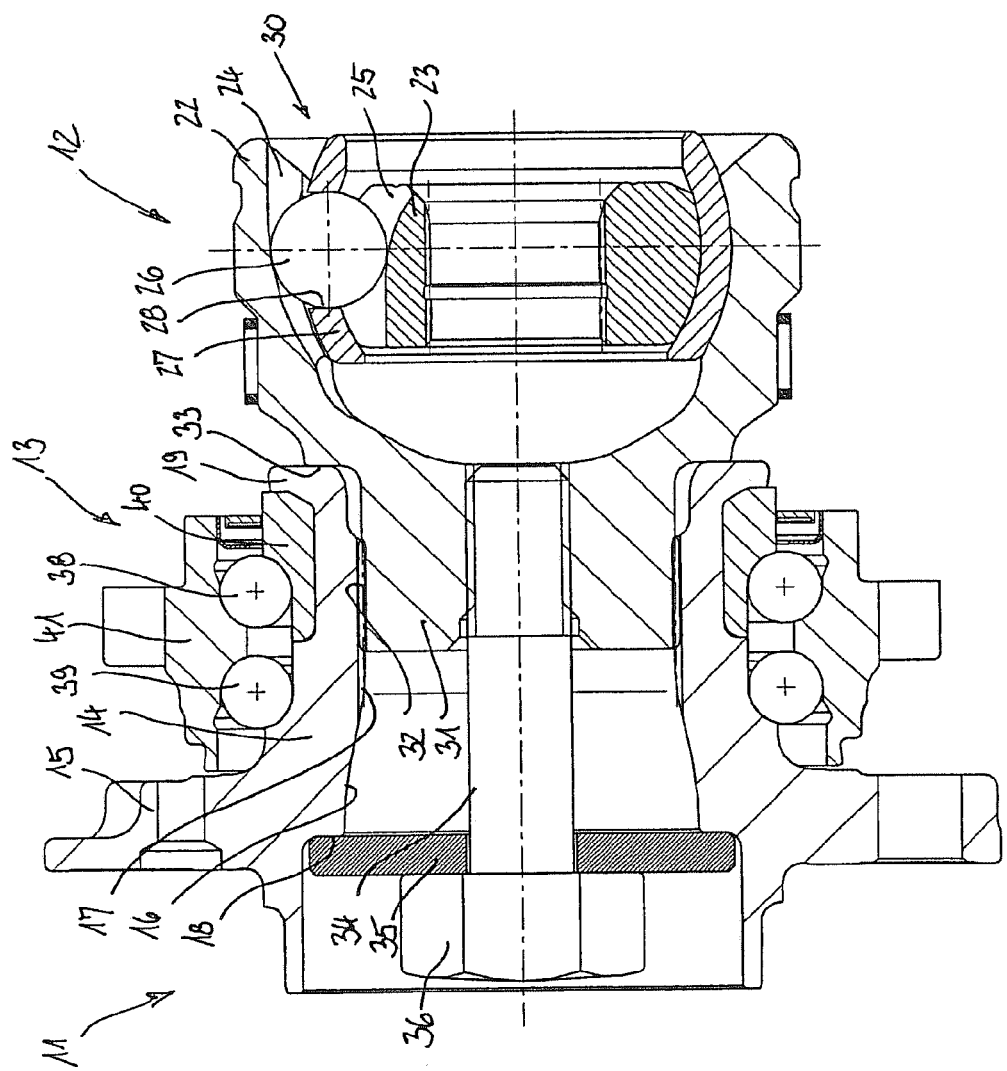
FIG. 2 shows a longitudinal section of a constant velocity joint-wheel hub assembly according to the state of the art with an ultra short journal at the outer joint part for tensioning and torque transmitting purposes.

FIGS. 1 and 2, which will be described jointly below, show a constant velocity joint-wheel hub assembly as known from the state of the art. FIGS. 1 and 2 show a wheel hub 11, a constant velocity joint 12 and a wheel bearing 13 in the form of assemblies. The wheel hub includes a sleeve portion 14 and a wheel flange 15 for threading on the wheel disc of a wheel. The sleeve portion 14 has a through-aperture 16 and inner splines 17. There are also shown a radial supporting face 18 and a beaded collar 19 which will both be referred to later. The constant velocity joint 12 has the outer joint part 22 and the inner joint part 23 which are typical components and known in themselves and in each of which there are formed outer ball tracks 24 and inner ball tracks 25. Furthermore, there are shown torque transmitting balls 26 which are guided in pairs of outer and inner ball tracks 24, 25 and which are held by a ball cage 27 in a common plane. In the joint as shown, the pairs of ball tracks 24, 25 widen from a joint base 29 towards an aperture 30. At the joint base 29, there is formed on an axial journal 31 which is provided with outer splines 32 which, in a rotationally fast way engage the splines 17 of the sleeve portion 14. The outer joint part 22 is supported by means of a radial supporting face 33 at the beaded collar 19. A tensioning screw 34 which, via a washer 35 supporting the screw head 35, is supported on the radial supporting face 19 of the wheel hub 11 is centrally threaded into the journal 31.

The wheel bearing 13 has two rows of bearing balls 38, 39 one of which run in a separate inner bearing race 40 which is axially secured by the beaded collar 19 while tensioning the bearing. Furthermore, the wheel bearing comprises an outer bearing race 41 which can be inserted into a wheel carrier.

Whereas in the embodiment according to FIG. 1 the through-aperture 16 is entirely cylindrical, with the journal 31 occupying a greater part of the through-aperture, the through-aperture 17 of the embodiment according to FIG. 2 widens conically towards the washer 35, whereas the journal 31 occupies only approximately half the length of the sleeve portion 14. In the designs as illustrated, the screw 34 is subjected to tensile and torsional loads when being threaded in, whereas the washer 35, more particularly in the embodiment according to FIG. 2, is clearly elastically deformed. There occurs a conical deformation like that of a plate spring.

FIGS. 3 to 9 will be described jointly below. FIGS. 3 to 9 show an inventive constant velocity joint-wheel hub assembly. As far as details are concerned, they each are shown to comprise a wheel hub 111, a constant velocity joint 112 and a wheel bearing 113 in the form of assemblies. The wheel hub comprises a sleeve portion 114 and a wheel flange 115 for threading on the wheel disc of a wheel. A through-aperture 116 is shown at the sleeve portion 114. Furthermore, there is shown a supporting face 118 and a beaded collar 119 to which reference will be made later. The wheel bearing 113 comprises two rows of bearing balls 138, 139 one of which run in a separate inner bearing race 140 which is axially secured by the beaded collar 119 while tensioning the bearing. The wheel bearing 113 also includes an outer bearing race 141 which can be inserted into a wheel carrier. The constant velocity joint 112 comprises the outer joint part 122 and the inner joint part 23 which are typical components and are known in themselves and in each of which there are formed outer ball tracks 24 and inner ball tracks 25. Furthermore, there are shown torque transmitting balls 26 which are guided in pairs of outer and inner ball tracks 24, 25 and which are held by a ball cage 27 in a common plane, with the balls 26 each being accommodated in cage windows 28.

The embodiments according to FIGS. 3 to 9 deviate from those according to FIGS. 1 and 2 in that the outer joint part 122, in addition to a first aperture 30 through which there has to be inserted a shaft connectable to the inner joint part, at the hub end, comprises a second aperture 37 which is engaged by an axial securing device and, respectively, through which there extends an axial securing device. Further, a form-fitting engagement mechanism is provided between the wheel hub 111 and outer joint part 122.

Figure 3:
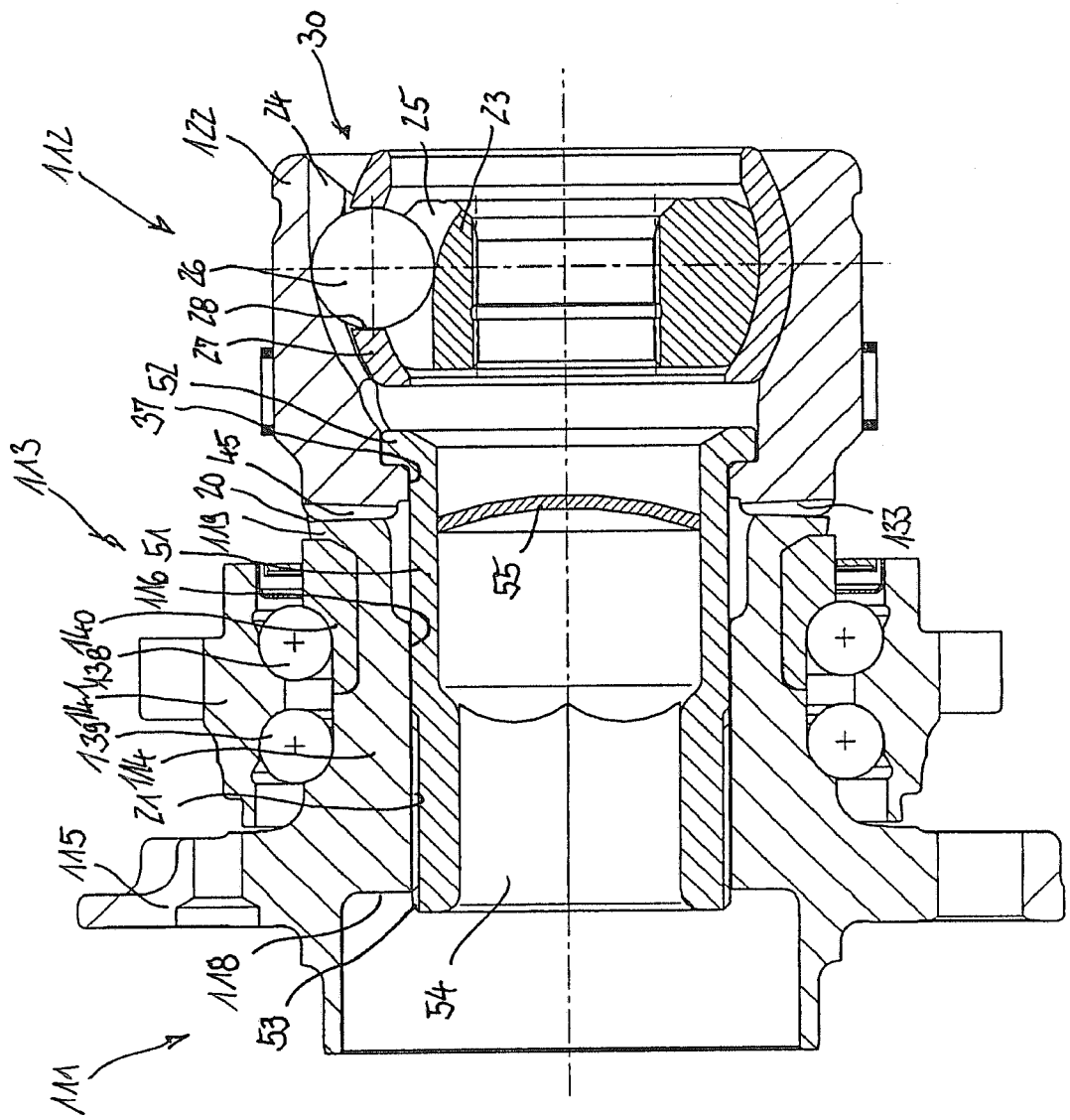
FIG. 3 shows a longitudinal section of an inventive constant velocity joint-wheel hub assembly in a first embodiment with a hollow screw for axial tensioning purposes, which is threaded into the wheel hub.

In the example of FIG. 3, the form-fitting engagement mechanism is provided as end teeth 45 at the supporting face 133 which, while transmitting torque, cooperate with matching end teeth 20 at the beaded collar 119. The axial tensioning device is provided in the form of a hollow screw 51 which, by an annular flange 52 is supported inside the outer joint part 122 and which, by an outer thread 53, is threaded into an inner thread 21 in the through-aperture 116 in the wheel hub 111. The hollow screw 51 thus has to be introduced into the outer joint part 122 prior to the constant velocity joint 112 being assembled completely. The hollow screw 51 is provided with a hexagon socket 54 for introducing torque for threading purposes. The hollow screw 51 comprises a clearance fit relative to the through-aperture 116, so that, when generating axial tension, no additional torsional forces—with the exception of threading forces—disadvantageously act on the hollow screw 51. In the hexagon socket of the hollow screw 51, close to the annular flange 52, there is inserted a cover 55 for sealing the constant velocity joint relative to the environment. In the present embodiment, the radial supporting face 118 at the wheel hub 111 remains without any function.

Figure 4:
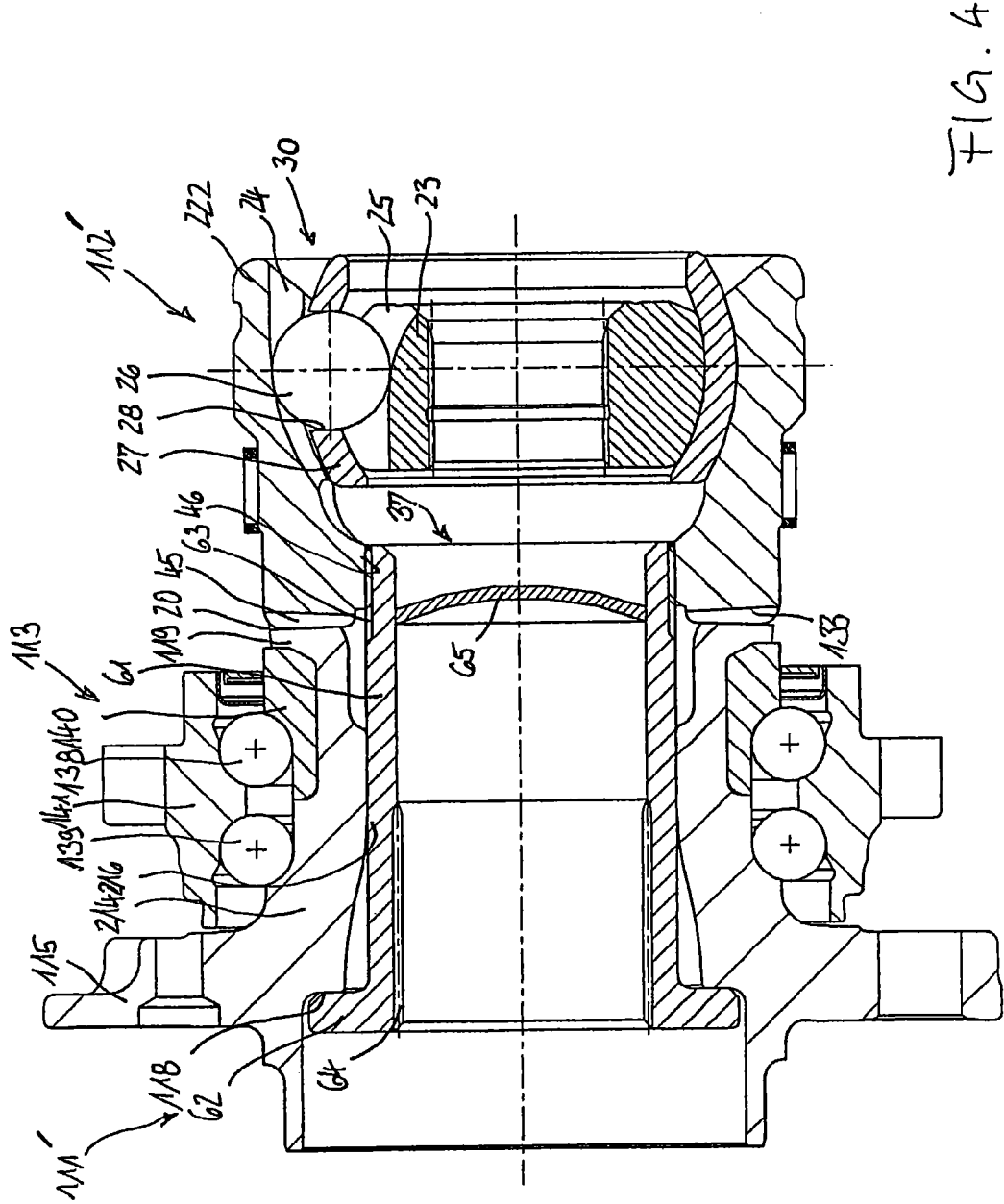
FIG. 4 shows a longitudinal section of an inventive constant velocity joint-wheel hub assembly in a second embodiment with a hollow screw for axial tensioning purposes, which is threaded into the outer joint part.

In FIG. 4, any details identical to those shown in FIG. 3 have been given the same reference numbers. To that extent, reference is made to the previous description. In this case, too, the form-fitting engagement mechanism is provided in the form of a supporting face 133 of the outer joint part 222 with end teeth 45 which, while transmitting torque under axial pretension, cooperate with corresponding end teeth 20 at the beaded collar 119 of the sleeve portion 214 of wheel hub 111'.

This embodiment deviates from FIG. 3 in that, for axial tensioning purposes, there is provided a hollow screw 61 which comprises an annular flange 62 which axially supportingly rests against the supporting face 118, with the hollow screw 61 being threaded by an outer thread 63 into an inner thread 46 in the second aperture 37 of the outer joint part 222 of constant velocity joint 112'. The through-aperture 216 of the sleeve portion 214, which through-aperture 216 is partially conically widened towards the flange 62, in this case, too, encloses with a clearance fit the hollow screw 61 so as not to apply any additional torsional forces—with the exception of the threading forces—to the hollow screw when threading in the hollow screw. For the purpose of introducing torque during the threading-in process, the hollow screw 61 comprises splines 64 into which a key with corresponding splines can temporarily be inserted. In the region of the aperture 37 of the outer joint part 222, a cover 65 is inserted into the cross-section of the hollow screw 61 for sealing purposes.

Figure 5:
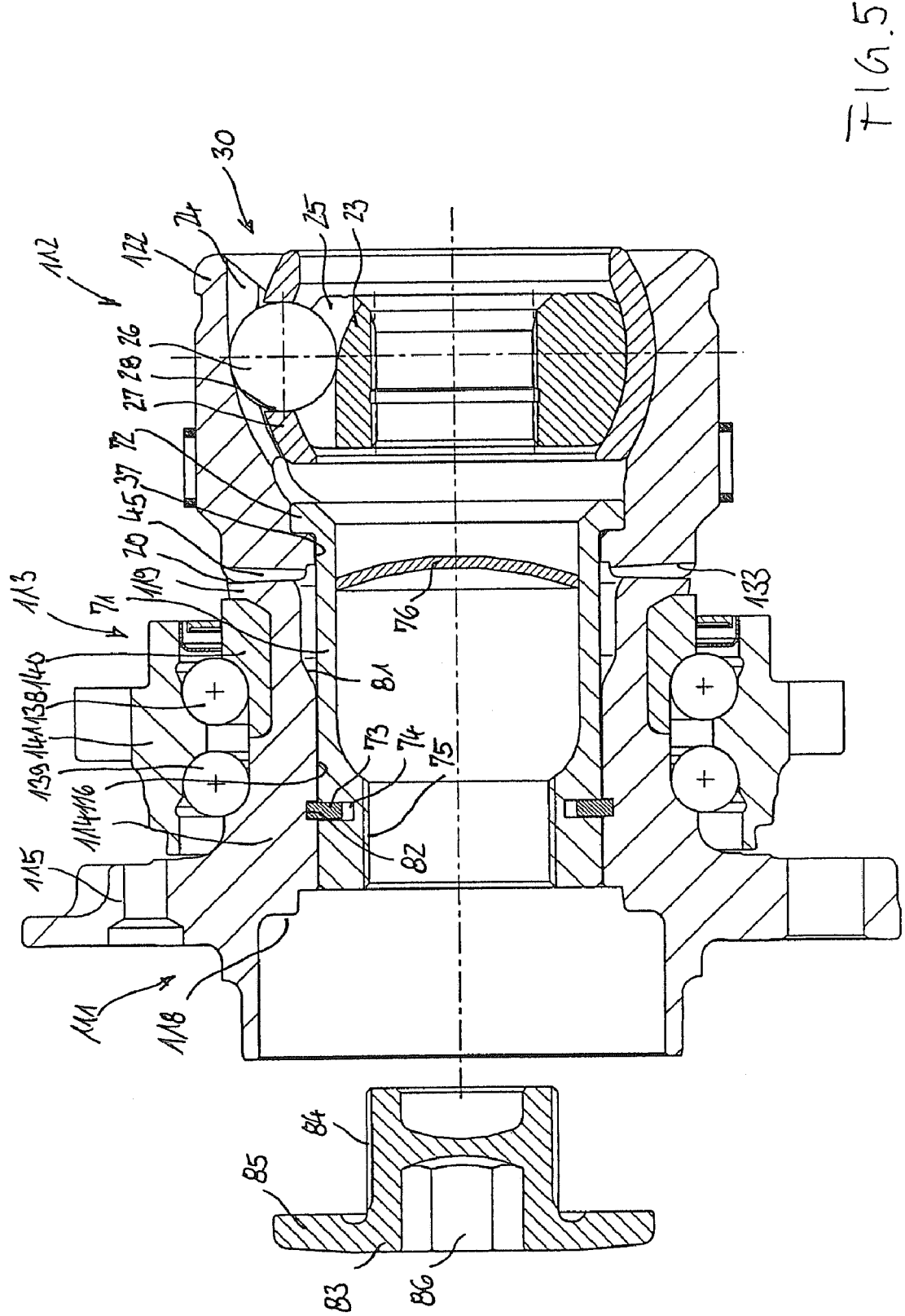
FIG. 5 shows a longitudinal section of an inventive constant velocity joint-wheel hub assembly in a third embodiment with a hollow pin for axial tensioning purposes, which is supported in the wheel hub via a securing ring.

In FIG. 5, any details identical to those shown in FIGS. 3 and 4 have been given the same reference numbers. To that extent, reference is made to the previous description. For the purpose of transmitting torque between the constant velocity joint and the wheel hub, the form-fitting engagement mechanism is again provided in the form of the supporting face 133 of the outer joint part 122 with end teeth 45 which, in a torque resistant way, engage corresponding end teeth 20 at the beaded collar 119 while under axial pretension. For axial tensioning purposes, a hollow pin 71 is inserted into the outer joint part 122 and into the sleeve portion 114, which hollow pin 71, by an annular flange 72, is supported inside the outer joint part 122 and which, at its other end, by way of a securing ring 73 positioned in an outer annular groove 74, engages under axial tensile stress an inner annular groove 82 in the through-aperture 116. As is evident from the function of the annular flange 72, the hollow pin 71 has to be inserted into the outer joint part 122 from the first aperture 30 prior to the constant velocity joint being assembled completely, with the securing ring 73 already having been inserted into the annular groove 74. The securing ring 73 is compressed by an inner chamfer 81 in the sleeve portion 114. The securing ring 73 does not engage the inner annular groove 82 in the sleeve portion 114 until the hollow pin 71 is subjected to sufficient axial pretension. To apply said pretension temporarily, an axial tensioner is threaded into an inner thread 75 in the hollow pin 71. In an advantageous embodiment, said tensioning element is provided in the form of a tensioning screw 83 with an outer thread 84, which tensioning screw 83 is able so support itself on the supporting face 18 by a collar 85. For the purpose of introducing torque, there is provided a hexagon socket 86 in the tensioning screw. Alternatively, a splined socket could be provided for introducing torque. As soon as the securing ring 73 has engaged the groove 81, the tensioning screw 83 can be removed again. In this case, too, the through-aperture 116 comprises a clearance fit relative to the hollow pin 71, so that no additional tensile forces are introduced into the tensioning element while the axial tension is generated.

Figure 6:
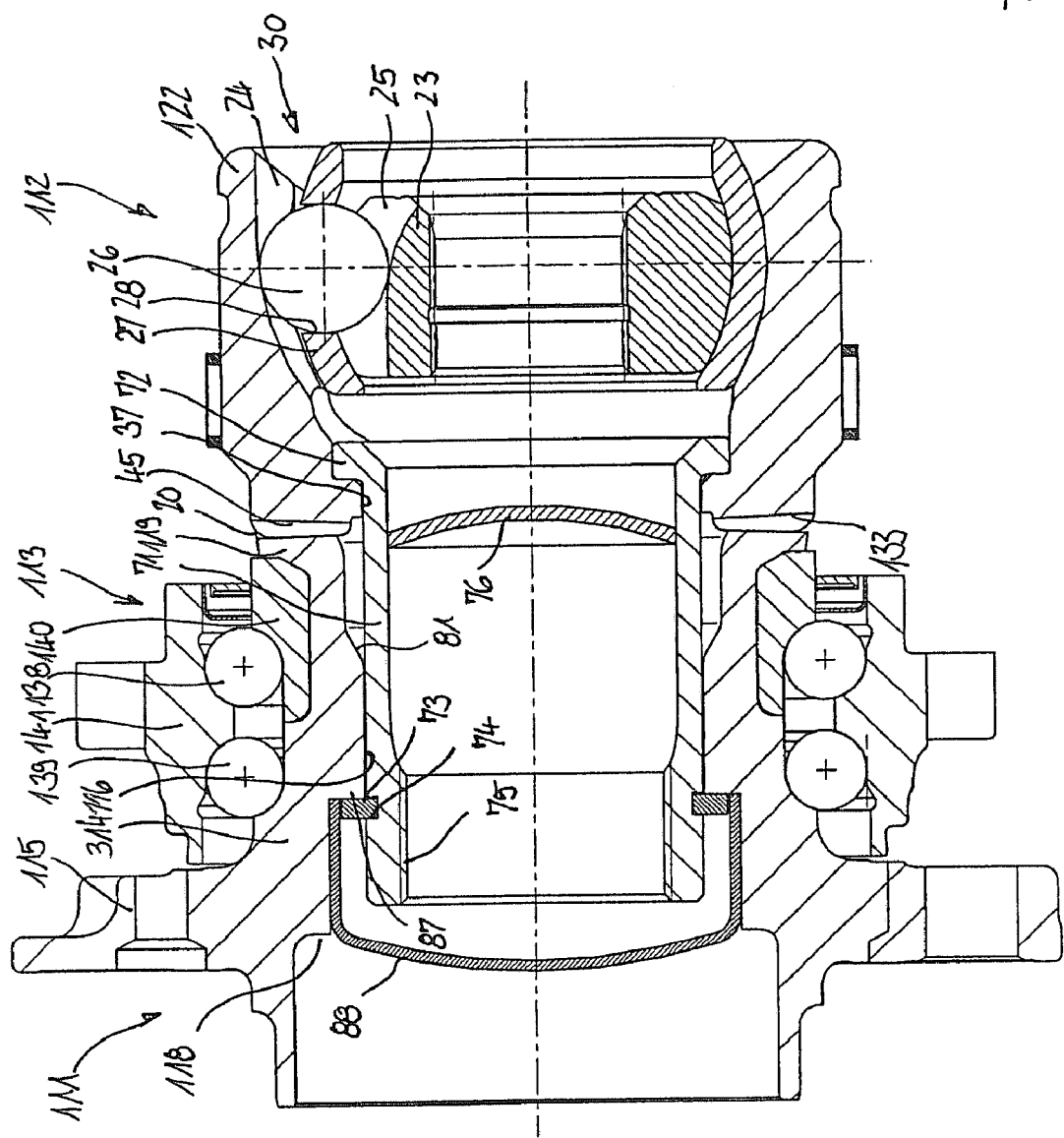
FIG. 6 shows a longitudinal section of an inventive constant velocity joint-wheel hub assembly in a fourth embodiment with a hollow pin for axial tensioning purposes, which is supported in the wheel hub via a securing ring.

The embodiment shown in FIG. 6 largely corresponds to that illustrated in FIG. 5. To that extent, reference is made to the preceding description. More particularly, the means for transmitting torque between the outer joint part 122 and the wheel hub 111 as well as the axial tensioning device, i.e. the hollow pin 71 with the radial flange 72 and a securing ring 73 engaging an annular groove 74, are fully identical. This also applies to the inner thread 75 and the axial tensioner 83 (not illustrated). Instead of the annular groove 82 in the sleeve portion 314 of the wheel hub, there is provided an inner step 87 in this embodiment behind which there engages the securing ring 73 when sufficiently high axial forces are applied. For preventing the securing ring 73 from releasing out of the annular groove, a cylindrical securing cap 88 is slid over the securing ring 73.

Figure 7:
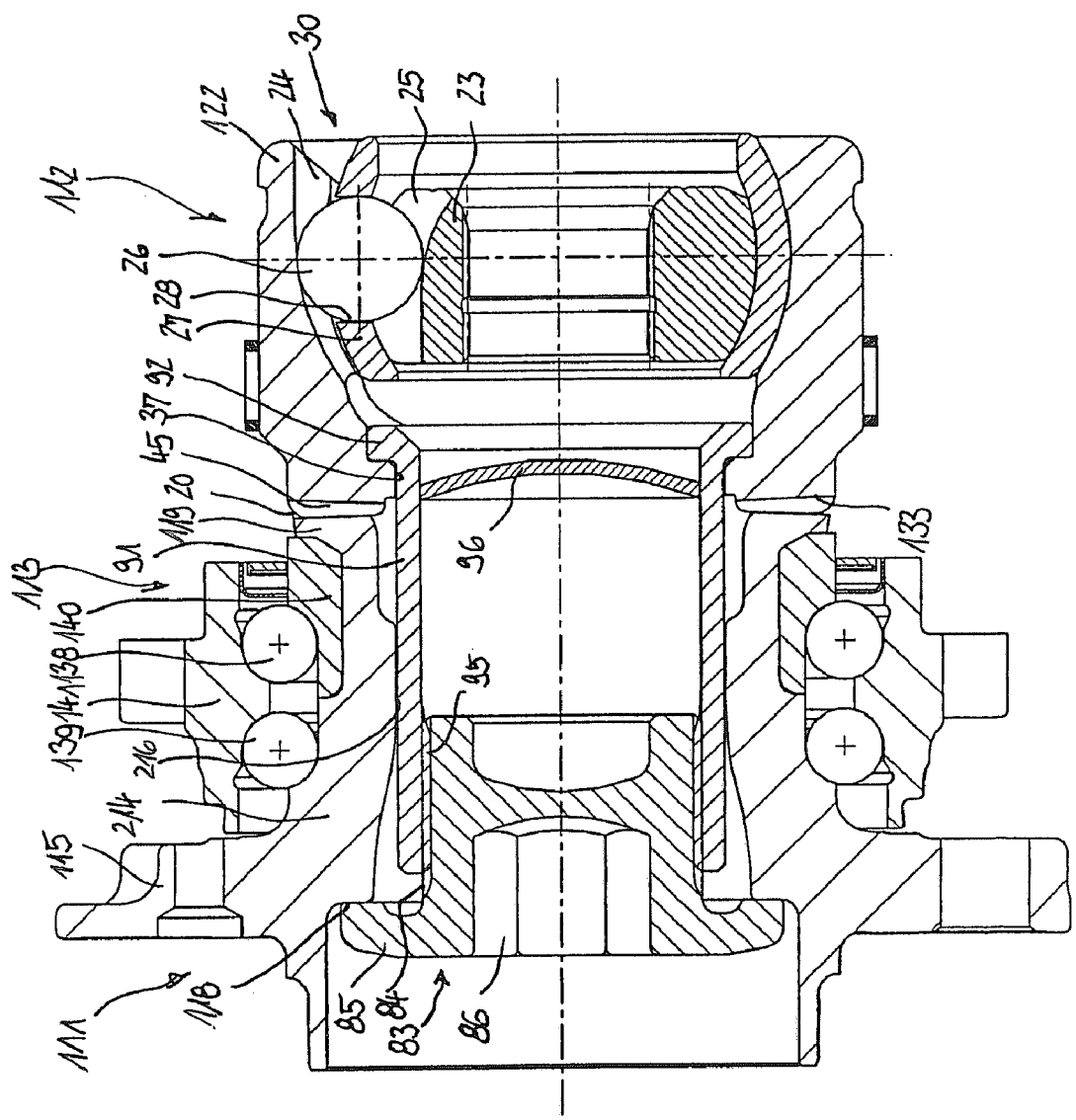
FIG. 7 shows a longitudinal section of an inventive constant velocity joint-wheel hub assembly in a fifth embodiment with a tensile sleeve for axial tensioning purposes, which is supported on the wheel hub via a threaded cover.

In FIG. 7, any details identical to those shown in FIGS. 3 to 6 have been given the same reference numbers. For the purpose of transmitting torque between the outer joint part 122 and the wheel hub 111, this embodiment, too, is provided with end teeth 45 in the supporting face 133 and corresponding end teeth 20 in the beaded collar 119. For axial tensioning purposes, there is provided a hollow pin 91 which is supported in the outer joint part 122 by way of an annular flange 92. In this case, too, axial tension has to be generated by inserting the hollow pin 91 through the apertures 30 and 37 prior to the constant velocity joint 112 being fully assembled. There are no securing rings of the type as provided in the embodiments illustrated in FIGS. 5 and 6. Instead, a tensioning screw 83 with an outer thread 84 is permanently threaded into an inner thread 95 of the hollow pin 91 to generate axial tensioning. In this case, too, the tensioning screw 83 comprises a collar 85 resting on the supporting face 118, as well as a hexagon socket 86 for introducing rotational forces. A splined socket could also be provided. The hollow pin 91 comprises a clearance fit relative to the through-aperture 216, so that—apart from the threading forces—no additional torsional forces are introduced into the hollow pin while axial tension is being generated.

Figure 8:
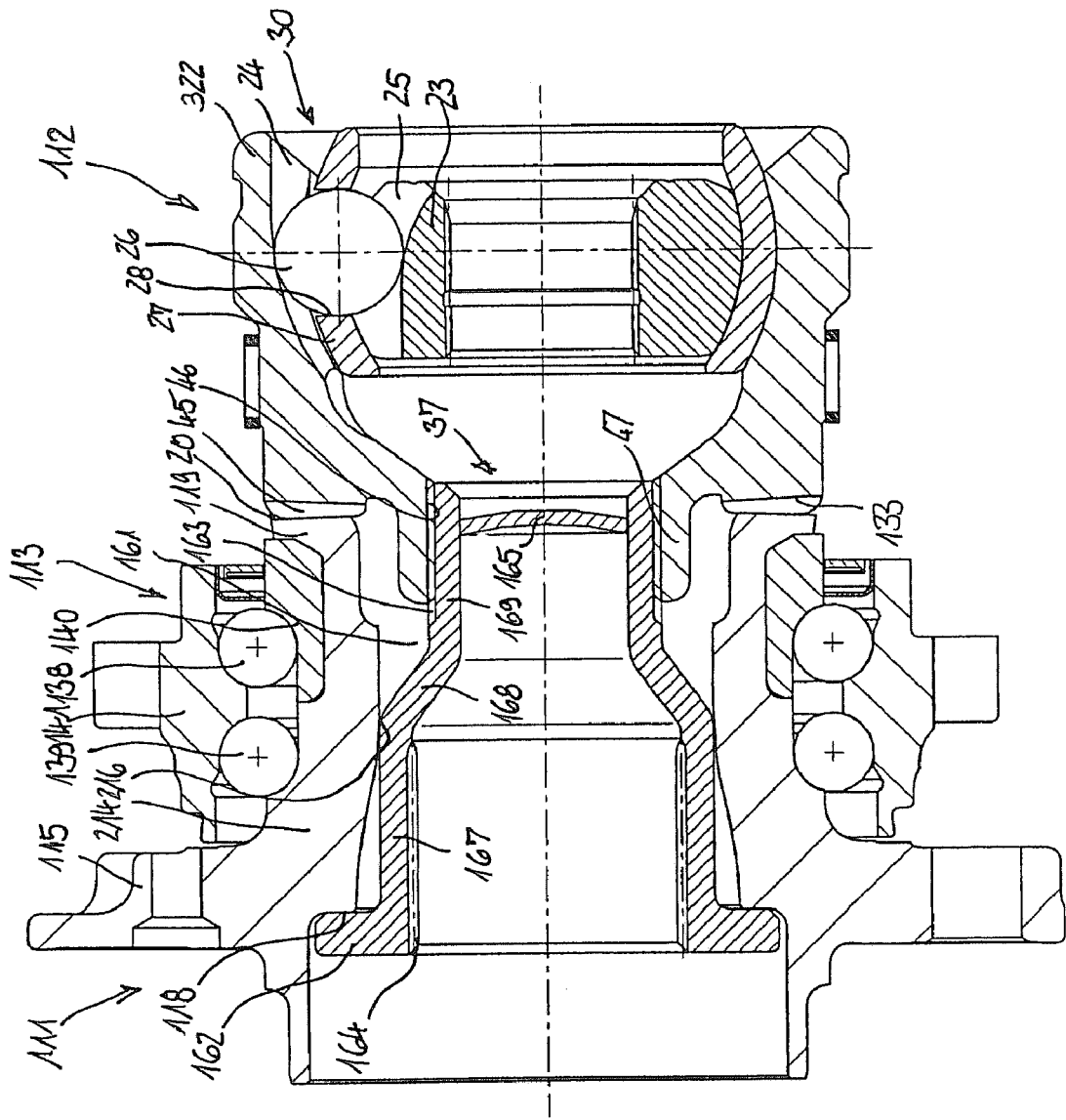
FIG. 8 shows a longitudinal section of an inventive constant velocity joint-wheel hub assembly in a sixth embodiment with a stepped hollow screw for axial tensioning purposes, which is threaded into the outer joint part.

In FIG. 8, any details corresponding to those shown in FIGS. 3 to 7 have been given the same reference numbers. The embodiment shown in FIG. 8 largely corresponds to that shown in FIG. 4. More particularly, the form-fitting engagement mechanism for transmitting torque between the outer joint part 322 and the wheel hub 111 is identical. For the purpose of generating axial tension between the outer joint part 322 and the wheel hub 111, there is provided a hollow screw 161 which is supported by means of a flange 162 on the supporting face 118 of the wheel hub 111 and which, by way of an outer thread 163, is threaded into an inner thread 46 of the outer joint part 322. Said inner thread 46 is provided in a sleeve portion 47 at the outer joint part 322. FIG. 8 deviates from FIG. 4 in that the hollow screw 161 comprises a first portion 167 with a greater diameter, a conical transition portion 168 and a second portion 169 with a smaller diameter which carries the outer thread 163. Inside the portion 167 there is provided a splined profile 164 for introducing a torque. A cover 165 seals the aperture 37 to the outer joint part 322.

Figure 9:
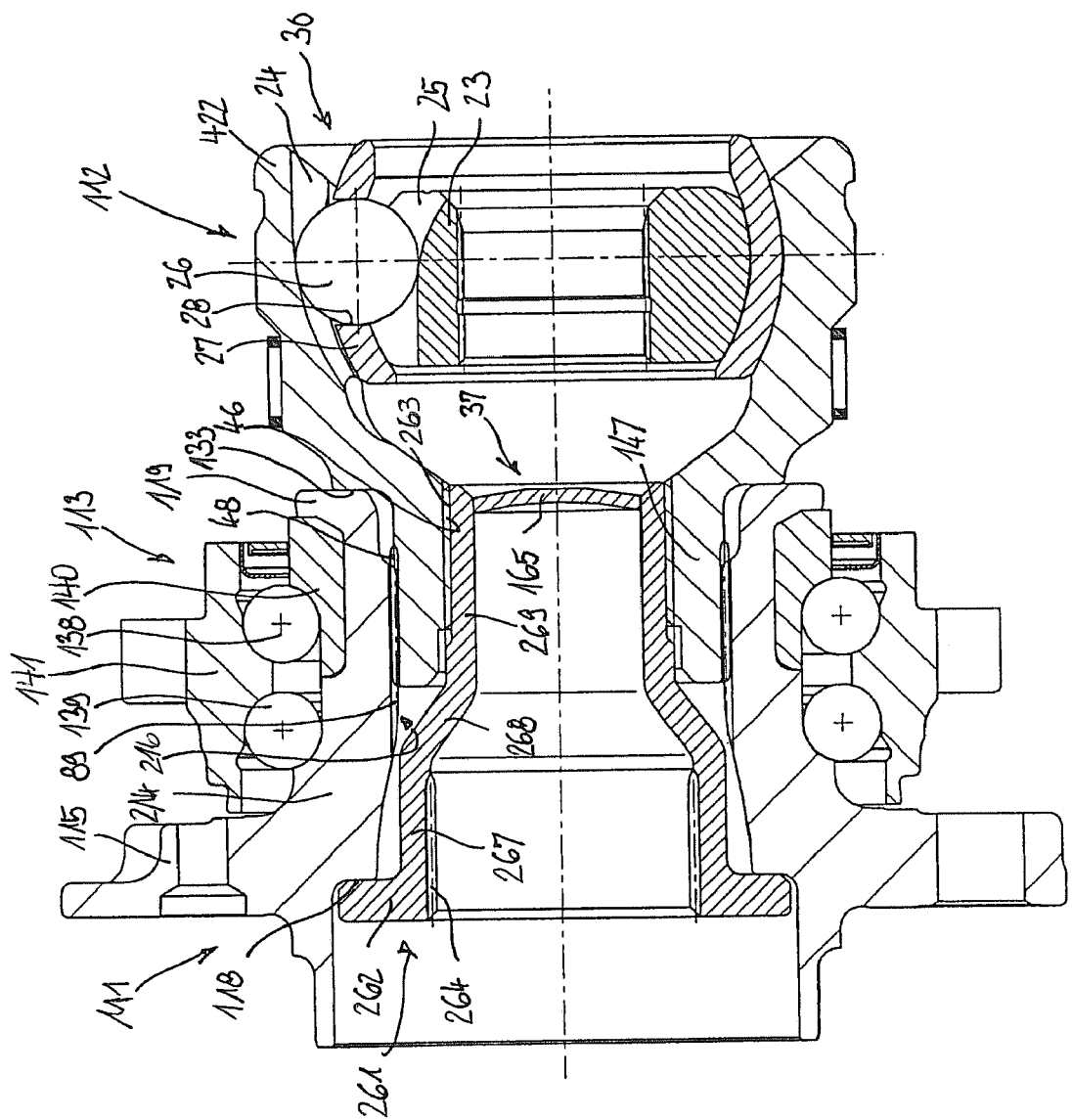
FIG. 9 shows a longitudinal section of an inventive constant velocity joint-wheel hub assembly in a seventh embodiment with a stepped hollow screw for axial tensioning purposes, which is threaded into the outer joint part.

In FIG. 9, any details corresponding to those shown in FIGS. 3 to 8 have been given the same reference numbers. The embodiment shown in FIG. 9 largely corresponds to that shown in FIG. 8 and to that extent, reference is made to the description of same. The details and proportions of the hollow screw 261 largely correspond to the above-described hollow screw 161. For the purpose of transmitting torque between the outer joint part 422 and the wheel hub 111, the form-fitting engagement mechanism comprises splines 48 on the outside of the sleeve projection 147, which splines 48, in a torque-resistant way, engage inner splines 89 in the sleeve portion 214. The beaded collar 119 and the supporting face 133 are provided in the form of planar radial faces to provide axial support. It can be seen in the present illustration, that when threaded in the hollow screw 261, torsional forces are introduced only from the region of the thread into the hollow screw 61. Like FIG. 8, the hollow screw 261 comprises a first portion 267 with a greater diameter and a spline inner profile 264, or conical transition portion 268, and a second portion 169 with a smaller diameter and carrying an outer thread 263.

In all the embodiments shown, centering between the outer joint part and the wheel hub is effected via the form-fitting engaging mechanism, i.e. end teeth or splines by which the two parts are connected to one another in a torque-resistant way.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A constant velocity joint-wheel hub assembly comprising:
    a wheel hub comprising a sleeve portion for receiving a wheel bearing and a flange for threading on a wheel;
    a constant velocity joint comprising an annular outer joint part with apertures at both ends;
    an axial securing device comprising a hollow member which is supported on the wheel hub by a formed-on flange ring and on the outer joint part by an outer thread formed axially opposite the flange ring and which outer thread is threaded into an inner thread in the outer joint part, the axial securing device passing through the sleeve portion and, through one aperture, engaging the outer joint part, and wherein the sleeve portion and the outer joint part contact one another in an axially mutually supporting way; and
    a form-fitting engagement mechanism between the sleeve portion and the outer joint part for the purpose of transmitting torque between the wheel hub and the constant velocity joint.

2. An assembly according to claim 1, wherein the hollow member is positioned with a clearance fit in a cylindrical through-aperture in the sleeve portion.

3. An assembly according to claim 1, wherein the hollow member comprises a hexagon socket or a splined socket for the purpose of introducing torque during a threading-in operation.

4. An assembly according to claim 1, wherein the form-fitting engagement mechanism comprises inter-engaging teeth at the sleeve portion of the wheel hub and at the outer joint part.

5. An assembly according to claim 4 comprising a wheel bearing slipped on to the sleeve portion, and an inner bearing race held by a beaded collar of the sleeve portion, wherein said inter-engaging end teeth of the sleeve portion are on an end face of the beaded collar.

6. An assembly according to claim 1, wherein the form-fitting engagement mechanism comprises inter-engaging splines at the sleeve portion of the wheel hub and at the outer joint part.

7. An assembly according to claim 6 comprising inner splines at the sleeve portion and outer splines at the outer joint part.

8. An assembly according to claim 1, wherein the hollow member comprises two portions with a stepped diameter, the portion having a smaller diameter carrying an outer thread which is threaded into an inner thread of the outer joint part.

9. An assembly according to claim 1 comprising a cover sealingly inserted into the hollow member.

* * * * *

UNITED STATES PATENT AND TRADEMARK OFFICE
CERTIFICATE OF CORRECTION

PATENT NO. : 7,621,817 B2  Page 1 of 1
APPLICATION NO. : 11/554121
DATED : November 24, 2009
INVENTOR(S) : Herbert Cermak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Twenty-sixth Day of October, 2010

David J. Kappos
*Director of the United States Patent and Trademark Office*